(12) United States Patent
Tsukagoshi et al.

(10) Patent No.: US 9,191,576 B2
(45) Date of Patent: Nov. 17, 2015

(54) IMAGING APPARATUS HAVING OPTICAL ZOOM MECHANISM, VIEWING ANGLE CORRECTION METHOD THEREFOR, AND STORAGE MEDIUM

(71) Applicant: CASIO COMPUTER CO., LTD., Shibuya-ku, Tokyo (JP)

(72) Inventors: Takeshi Tsukagoshi, Ome (JP); Kenzo Sashida, Ome (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 14/199,806

(22) Filed: Mar. 6, 2014

(65) Prior Publication Data

US 2014/0253762 A1 Sep. 11, 2014

(30) Foreign Application Priority Data

Mar. 7, 2013 (JP) ................................. 2013-045399

(51) Int. Cl.
*H04N 5/232* (2006.01)
(52) U.S. Cl.
CPC ................................. *H04N 5/23296* (2013.01)
(58) Field of Classification Search
USPC ....................................................... 348/240.1
See application file for complete search history.

(56) References Cited

U.S. PATENT DOCUMENTS

| | | | |
|---|---|---|---|
| 5,943,513 A | 8/1999 | Kim | |
| 6,046,770 A | 4/2000 | Uemura et al. | |
| 8,576,287 B2 * | 11/2013 | Kumagai | 348/208.12 |
| 8,982,246 B2 * | 3/2015 | Shibuno | 348/240.1 |
| 2004/0017491 A1 * | 1/2004 | Stavely | 348/240.2 |
| 2009/0167896 A1 * | 7/2009 | Nakayama | 348/240.1 |

FOREIGN PATENT DOCUMENTS

| | | |
|---|---|---|
| JP | 05-103243 A | 4/1993 |
| JP | 09-247517 A | 9/1997 |
| JP | 2004-023580 A | 1/2004 |
| KR | 100192034 B1 | 6/1999 |

OTHER PUBLICATIONS

Japanese Office Action dated Apr. 16, 2014 (and English translation thereof) in counterpart Japanese Application No. 2013-045399.
Korean Office Action (and English translation thereof) dated May 30, 2015, issued in counterpart Korean Application No. 10-2014-0026387.

* cited by examiner

*Primary Examiner* — Albert Cutler
(74) *Attorney, Agent, or Firm* — Holtz, Holtz, Goodman & Chick PC

(57) ABSTRACT

In the present invention, when a backlash control operation is being performed, the position of a zoom lens at the time of image capturing and the captured image are stored in association with each other. Subsequently, an image processing section trims the periphery of the captured image in accordance with the focal length of a target position (WIDE end) and the focal length of the position of the zoom lens associated with the captured image, and enlarges the trimmed image to a normal size (size for use in a live view or a size of the image before being trimmed). Then, a display section displays the image subjected to the image processing as a live view image.

13 Claims, 5 Drawing Sheets

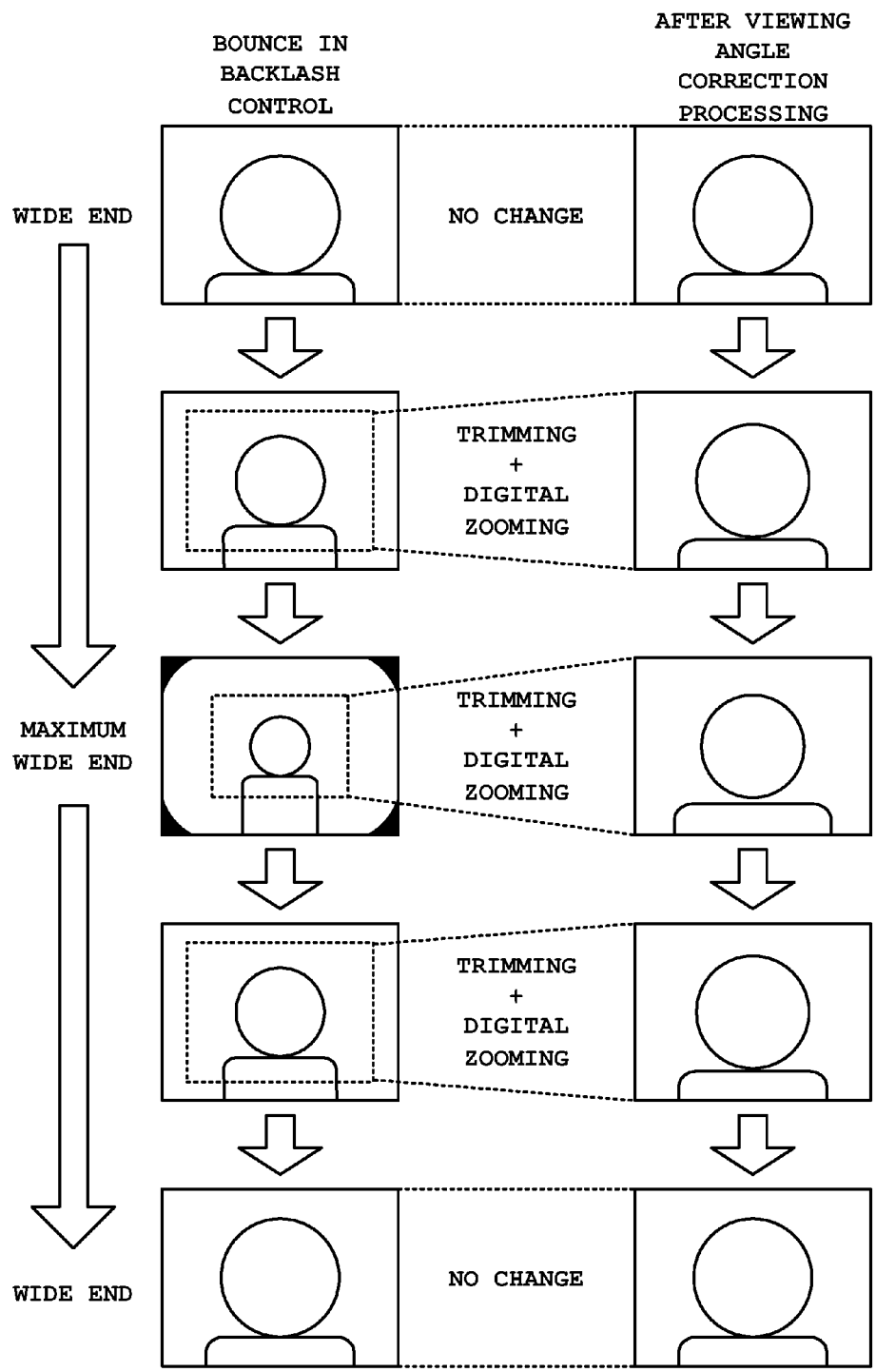

IMAGING APPARATUS HAVING OPTICAL ZOOM MECHANISM, VIEWING ANGLE CORRECTION METHOD THEREFOR, AND STORAGE MEDIUM

CROSS-REFERENCE TO RELATED APPLICATION

This application is based upon and claims the benefit of priority from the prior Japanese Patent Application No. 2013-045399, filed Mar. 7, 2013, the entire contents of which are incorporated herein by reference.

BACKGROUND OF THE INVENTION

1. Field of the Invention

The present invention relates to an imaging apparatus having an optical zoom mechanism, a viewing angle correction method therefor, and a storage medium.

2. Description of the Related Art

In a digital camera having an optical zoom mechanism where the operating range of the zoom lens is defined as a range from a WIDE end to a TELE end, when the zoom lens is to be moved to the WIDE end or the TELE end, it is in some cases difficult to stop the zoom lens at these or one of these endpoints without the zoom lens straying off the defined operating range (backlash). In these cases, a backlash control operation is required to be performed by which the zoom lens is once moved by an extra distance toward the WIDE side or the TELE side from the endpoint and then moved back to the end point.

When the zoom lens is being moved by an extra distance toward the WIDE side, images having a viewing angle wider than the original viewing angle at the wide angle end of the lens enter, and whereby the zoom operation includes a bouncing sort of movement.

If an image exposed at this point is outputted to a display device as it is, the bounce in the zoom operation may directly be displayed. In a range wider than the WIDE end, noise, vignetting, and the like around the lens may be displayed. To prevent these problems, a technology has been proposed which reduces the bounce in the zoom operation due to the backlash control operation and the display of noise, vignetting, and the like around the lens in the wide-angle range.

However, for example, in a technology disclosed in Japanese Patent Application Laid-Open (Kokai) Publication No. 2004-023580, display update is stopped at the time of backlash. Therefore, a real view image freezes during the stop (approximately one second), which makes a user feel a sense of incongruity.

Also, Japanese Patent Application Laid-Open (Kokai) Publication No. 05-103243 discloses a technology for seamlessly performing optical zooming and digital zooming, whereby an operation delay due to backlash can be solved. However, with this technology, the bounce in the zoom operation due to the backlash control operation and the display of noise, vignetting, and the like around the lens in the wide-angle range cannot be reduced.

SUMMARY OF THE INVENTION

In accordance with one aspect of the present invention, there is provided an imaging apparatus having an optical zoom mechanism, comprising: an imaging section; a correcting section which corrects a viewing angle of an image captured by the imaging section when backlash control is performed on backlash that occurs when a zoom operation of the optical zoom mechanism is performed; and a display section which displays the image corrected by the correcting section.

In accordance with another aspect of the present invention, there is provided a viewing angle correction method by an imaging apparatus having an optical zoom mechanism, comprising: imaging a subject at predetermined timing; correcting a viewing angle of a captured image when backlash control is performed on backlash that occurs when a zoom operation of the optical zoom mechanism is performed; and displaying the corrected image.

In accordance with another aspect of the present invention, there is provided a non-transitory computer-readable storage medium having stored thereon a program that is executable by a computer which controls an imaging apparatus having an optical zoom mechanism, the program causing the computer to perform functions comprising: causing an imaging section to image a subject at predetermined timing; correcting a viewing angle of a captured image when backlash control is performed on backlash that occurs when a zoom operation of the optical. zoom mechanism is performed; and causing a display section to display the corrected image.

The above and further objects and novel features of the present invention will more fully appear from the following detailed description when the same is read in conjunction with the accompanying drawings. It is to be expressly understood, however, that the drawings are for the purpose of illustration only and are not intended as a definition of the limits of the invention.

BRIEF DESCRIPTION OF THE DRAWINGS

The present invention can be more deeply understood by the detailed description below being considered together with the following drawings.

FIG. 5 is a schematic diagram showing an example of display by the digital camera according to the present embodiment at the time of backlash control operation.

DETAILED DESCRIPTION OF THE PREFERRED EMBODIMENT

An embodiment of the present invention is described below with reference to the drawings.

A. Structure of Embodiment

Figure 1:
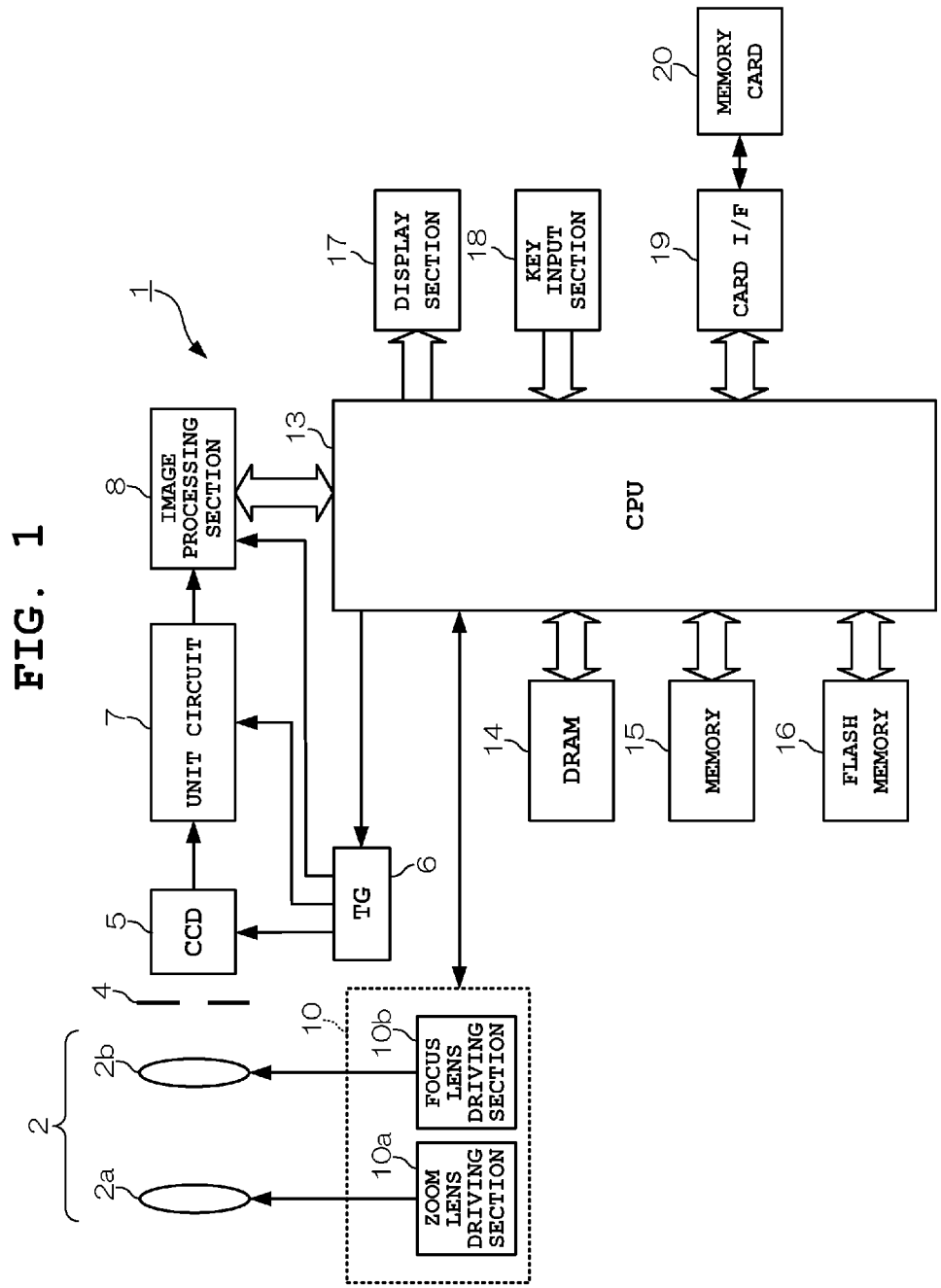
FIG. 1 is a block diagram showing the structure of a digital camera according to an embodiment of the present invention.

FIG. 1 is a block diagram showing the structure of a digital camera 1 according to an embodiment of the present invention. In the drawing, the digital camera 1 includes an imaging lens 2, a diaphragm/shutter 4, a CCD (Charge-Coupled Device) 5, a TG (Timing Generator) 6, a unit circuit 7, an image processing section 8, a lens driving section 10, a CPU (Central Processing Unit) 13, a DRAM (Dynamic Random Access Memory) 14, a memory 15, a flash memory 16, a display section 17, a key input section 18, a card I/F 19, and a memory card 20.

The imaging lens 2 includes a zoom lens 2a and a focus lens 2b, and has the lens driving section 10 connected thereto.

The lens driving section 10 is structured to include a zoom lens driving section 10a which drives the zoom lens 2a and a focus lens driving section 10b which drives the focus lens 2b. The zoom lens driving section 10a is constituted by a zoom motor which drives the zoom lens 2a in an optical axis direction according to a control signal from the CPU 13 and a zoom motor driver which drives the zoom motor. The focus lens driving section 10b is constituted by a focus motor which drives the focus lens 2b in the optical axis direction according to a control signal from the CPU 13 and a focus motor driver which drives the focus motor.

The zoom motor and the focus motor described above (omitted in the drawing) are stepping motors, and precisely move the zoom lens 2a and the focus lens 2b, respectively, on the optical axis by step driving based on a control signal sent from the CPU 13. Also, the zoom motor and the focus motor (omitted in the drawing) or the driving mechanisms of the zoom lens 2a and the focus lens 2b are provided with a detection mechanism (such as an encoder) which detects the positions of the zoom lens 2a and the focus lens 2b, whereby the positions of the zoom lens 2a and the focus lens 2b are continuously fed back.

The diaphragm/shutter 4 includes a drive circuit not depicted in the drawing, and is operated by the drive circuit according to a control signal sent from the CPU 13. This diaphragm/shutter 4 controls the amount of light entering from the zoom lens 2a and the focus lens 2b. The CCD (image pickup device) 5 converts light of a subject projected via the zoom lens 2a, the focus lens 2b, and the diaphragm/shutter 4 to an electrical signal, and outputs it to the unit circuit 7 as an imaging signal. This CCD 5 is driven in accordance with a timing signal of a predetermined frequency generated by the TG 6.

The unit circuit 7 is structured to include a CDS (Correlated Double Sampling) circuit which performs correlated double sampling on an imaging signal outputted from the CCD 5 and retains it, an AGC (Automatic Gain Control) circuit which performs automatic gain adjustment of an imaging signal subjected to correlated double sampling, and an A/D converter which converts an analog imaging signal after automatic gain adjustment to a digital signal. This unit circuit 7 is also driven in accordance with a timing signal of a predetermined frequency generated by the TG 6. The imaging signal from the CCD 5 is sent to the image processing section 8 via the unit circuit 7, as a digital signal.

The image processing section 8 performs image processing (pixel interpolation processing, γ-correction, luminosity color difference signal generation, white balance processing, exposure correction processing, etc.) on image data sent from the unit circuit 7, compression and expansion processing of image data (such as compression and extension in Joint Photographic Experts Group (JPEG) format, Motion-JPEG [M-JPEG] format, or Moving Picture Experts Group (MPEG) format), and processing such as trimming of a captured image and digital zooming of a captured image. This image processing section 8 is also driven in accordance with a timing signal of a predetermined frequency generated by the TG 6.

The CPU 13 is a single-chip microcomputer which controls each section of the digital camera 1. Particularly, in the present embodiment, this CPU 13 controls trimming of a captured image at the wide-angle end, enlargement (digital zooming) of a captured and trimmed image, display of a captured image subjected to image processing on the display section 17 (live view display), and the like, in order to reduce a bounce in a zoom operation due to a backlash control operation at the time of zoom control and display of noise, vignetting, and the like around the lens in the wide-angle range.

The DRAM 14 is used as a buffer memory for temporarily storing image data captured by the CCD 5 and sent to the CPU 13, and also used as a working memory for the CPU 13. The CPU 13 performs control such that the processing described above is performed on a captured image stored in the DRAM 14. The memory 15 has recorded thereon necessary programs and data required for the CPU 13 to control the respective sections of the digital camera 1, and the CPU 13 performs processing according to these programs. The flash memory 16 and the memory card 20 are recording media where image data captured by the CCD 5 and the like are stored.

The display section 17 includes a color liquid-crystal display and its drive circuit. In an imaging-standby state, the display section 17 displays an image captured by the CCD 5 as a live view image. Also, the display section 17 displays a recorded image read out from the flash memory 16 or the memory card 20 and expanded when it is replayed. The key input section 18 includes a plurality of operation keys such as a shutter switch, a zoom switch, a mode key, a SET key, and a cross key, and outputs an operation signal according to a key operation by the user to the CPU 13. The memory card 20 is detachably mounted on the card I/F 19 by a card slot (not shown) in the main body of the digital camera 1.

B. Operation of Embodiment

Next, the operation of the above-described embodiment is described.

Figure 2:
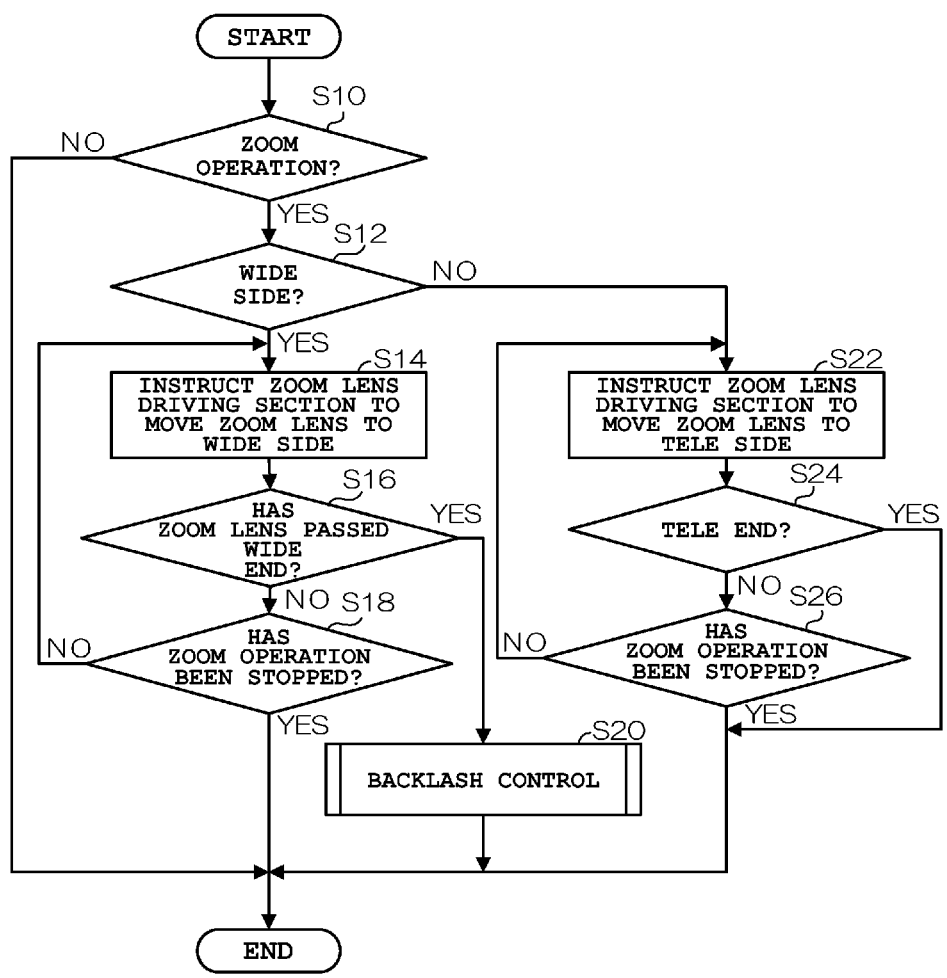
FIG. 2 is a flowchart for describing an operation (zoom operation) of the digital camera according to the present embodiment.

FIG. 2 is a flowchart for describing an operation (zoom operation) of the digital camera 1 according to the present embodiment. First, the CPU 13 judges whether the zoom switch of the key input section 18 has been operated (Step S10). When judged that the zoom switch has not been operated (NO at Step S10), the CPU 13 ends the processing. Conversely, when judged that the zoom switch of the key input section 18 has been operated (YES at Step S10), the CPU 13 judges whether this operation has been performed to move the zoom lens 2a to the WIDE side(Step S12). When judged that the operation has been performed to move the zoom lens 2a to the WIDE side (YES at Step S12), the CPU 13 instructs the zoom lens driving section 10a to move the zoom lens 2a to the WIDE side, and indicates a target position (which is updated while the zoom switch is being operated), whereby the zoom lens 2a is moved to the WIDE side (Step S14).

Next, the CPU 13 judges whether the zoom lens 2a has passed the WIDE end based on the fed-back position of the zoom lens 2a (Step S16). When judged that the zoom lens 2a has not passed the WIDE end (NO at Step S16), the CPU 13 judges whether the zoom operation by the zoom switch of the key input section 18 has been stopped (Step S18). When judged that the zoom operation has not been stopped (NO at Step S18), the CPU 13 returns to Step S14 to continue the movement of the zoom lens 2a to the WIDE side. Conversely, When judged that the zoom operation has been stopped (YES at Step S18), the CPU 13 ends the processing.

At Step S16, when judged that the zoom lens 2a has passed the WIDE end in the course of the zoom operation (YES at Step S16), the CPU 13 performs a backlash control operation for returning the zoom lens 2a that has been moved too far to the target position (Step S20).

As described above, backlash occurs in the movement of the zoom lens 2a to the WIDE side. That is, even if the zoom lens 2a reaches the WIDE end (the focal length at the WIDE end is, for example, 28 mm), the zoom lens 2a does not stop at the WIDE end, and stops after passing the WIDE end. (This position is referred to as a maximum WIDE end. The focal length at this maximum wide end is, for example, 25 mm). Thus, the control system of the zoom lens 2a performs a backlash control operation to return the zoom lens 2a from the maximum WIDE end to the WIDE end. The backlash control itself is processed in, for example, a control system by the zoom lens driving section 10a.

At Step S12, when judged that the operation has been performed to move the zoom lens 2a to the TELE side (NO at Step S12), the CPU 13 instructs the zoom lens driving section 10a to move the zoom lens 2a to the TELE side, and indicates a target position (which is updated while the zoom switch is being operated), whereby the zoom lens 2a is moved to the TELE side (Step S22). Next, the CPU 13 judges whether the zoom lens 2a has reached the TELE end based on the feedback position of the zoom lens 2a (Step S24).

When judged that the zoom lens 2a has not reached the TELE end (NO at Step S24), the CPU 13 judges whether the zoom operation by the zoom switch of the key input section 18 has been stopped (Step S26). When judged that the zoom operation has not been stopped (NO at Step S26), the CPU 13 returns to Step S22 to continue the movement of the zoom lens 2a to the TELE side. Conversely, when judged that the zoom operation has been stopped (YES at Step S26) or the zoom lens 2a has reached the TELE end (YES at Step S24), the CPU 13 ends the processing.

Figure 3:
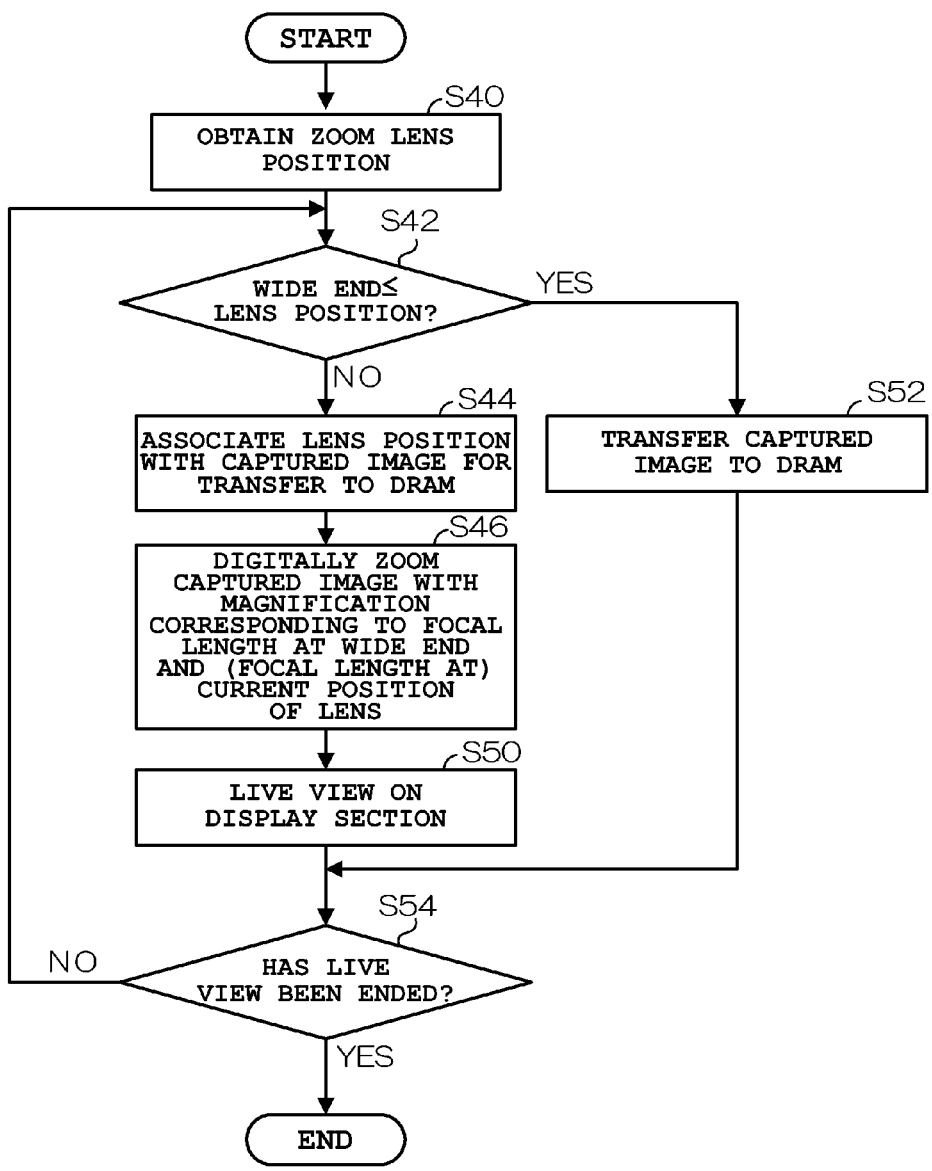
FIG. 3 is a flowchart for describing the live view operation of the digital camera according to the present embodiment.

FIG. 3 is a flowchart for describing a live view operation of the digital camera 1 according to the present embodiment. First, the CPU 13 obtains the position of the zoom lens 2a (Step S40). Next, the CPU 13 judges whether the zoom lens 2a is not positioned on the other side of the WIDE end, or in other words, judges whether the zoom lens 2a has not passed the WIDE end (Step S42). Note that, alternatively, the CPU 13 may simply judge whether a backlash control operation is being performed, based on feedback from the lens driving system.

When judged that the zoom lens 2a is not positioned at or on the other side of the WIDE end, or in other words, judged that the zoom lens 2a has not passed the WIDE end (YES at Step S42), the CPU 13 judges that a backlash control operation not being performed, and transfers an image captured by the CCD 5 to the DRAM 14 as it is (Step S52). Next, the CPU 13 judges whether the live view has been ended (Step S54). Note that the end of the live view herein indicates that an image-capturing operation by a shutter operation, an operation of calling a menu, or the like has been performed. When judged that the live view has not been ended (NO at Step S54), the CPU 13 returns to Step S42 to repeat the processing described above. Conversely, when judged that the live view has been ended (YES at Step S54), the CPU 13 ends the processing and proceeds to a predetermined operation.

At Step S42, when judged that the zoom lens 2a has passed the WIDE end (NO at Step S42), since a backlash control operation is being performed, the CPU 13 correlates the current position of the zoom lens 2a with an image captured by the CCD 5, and transfers the captured image to the DRAM 14 (Step S44).

Next, the CPU 13 reads out the captured image stored in the DRAM 14 and supplies it to the image processing section 8 where trimming and digital zoom processing are performed on the captured image based on a focal length at the target position (WIDE end) (for example, 28 mm) and a focal length at the current position of the zoom lens 2a (for example, 25 mm to 28 mm) (Step S46). Specifically, the periphery of the captured image is trimmed according to the focal length at the target position (WIDE end) and the focal length at the current position of the zoom lens 2a, and the trimmed image is enlarged to a normal size (a size for use in the live view or the size of the image before being trimmed) by enlargement processing. Note that, in the present embodiment, the difference between the focal length at the target position (WIDE end) and the focal length at the current position of the zoom lens 2a is referred to as a backlash amount.

Next, the CPU 13 causes the captured image subjected to the digital zoom processing to be displayed on the display section 17 as a live view (Step S50). Next, the CPU 13 judges whether the live view has been ended (Step S54). When judged that the live view has not been ended (NO at Step S54), the CPU 13 returns to Step S42 to repeat the processing described above. Conversely, when judged that the live view has been ended (YES at Step S54), the CPU 13 proceeds to a predetermined operation.

Figure 4:
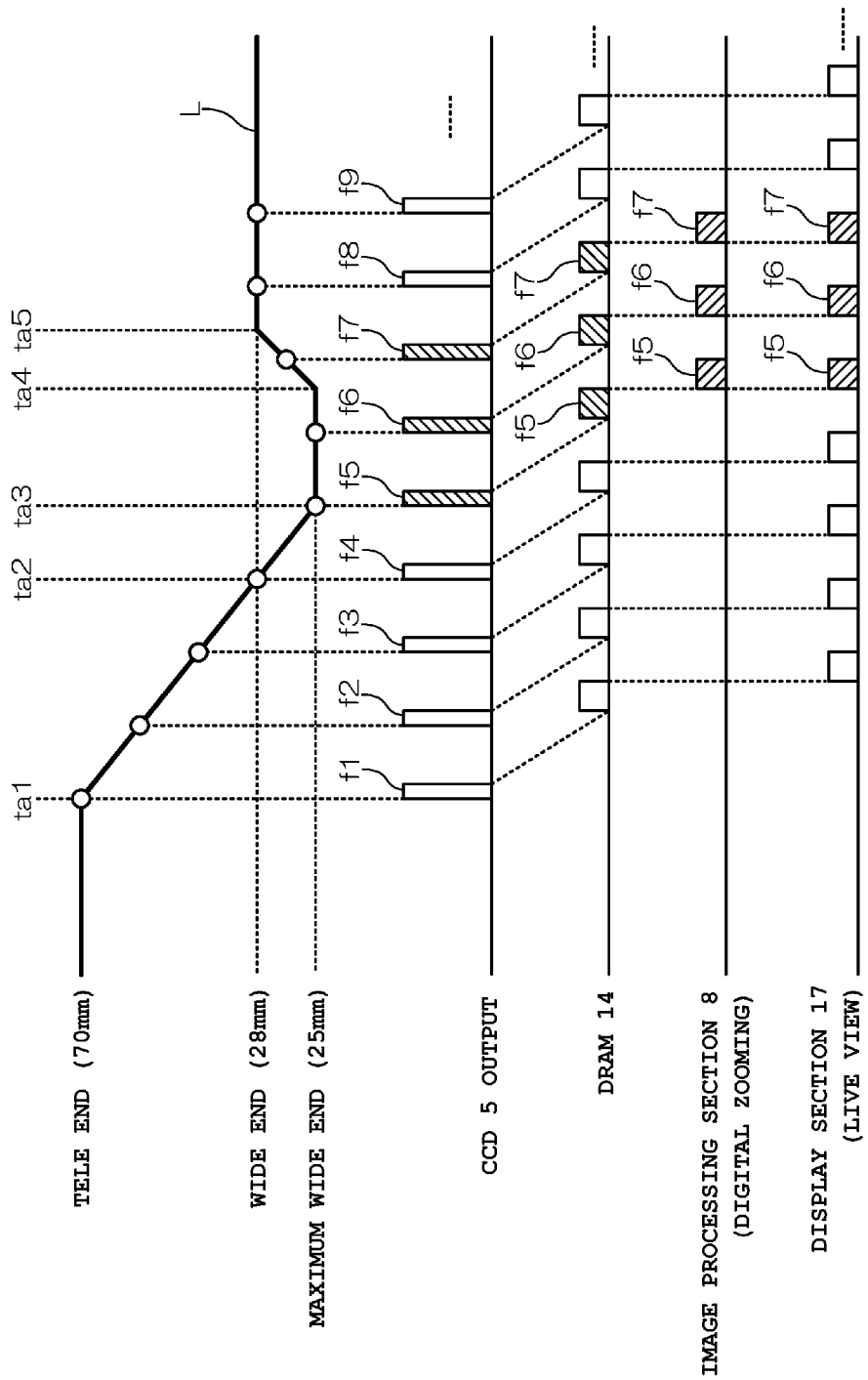
FIG. 4 is a sequence diagram for describing an operation of the digital camera (live views at the time of zoom operation and backlash control operation) according to the present embodiment.

FIG. 4 is a sequence diagram for describing an operation (live views at the time of zoom operation and backlash control operation) of the digital camera 1 according to the present embodiment. In the upper portion of FIG. 4, positions of the zoom lens 2a are shown, and the movement of the zoom lens 2a from the TELE end (for example, 70 mm) to the WIDE end (for example, 28 mm) and the maximum WIDE end (for example, 25 mm) is indicated by a line L. The zoom lens 2a positioned at the TELE end at a time ta1 reaches the WIDE end at a time ta2, and reaches the maximum WIDE end at a time ta3. Also, at a time ta4, the zoom lens 2a moves in a reverse direction from the maximum WIDE end to the WIDE end, and then returns to the WIDE end at a time ta5. That is, a backlash control operation being performed during a period from the time ta2 to the time ta5.

White circles on the line L each represent output timing (image-capture timing) of the CCD 5. In practice, the image capturing is performed at intervals of, for example, 30 fps. An image captured from the CCD 5 at the time ta1 is taken as f1, and the following captured images are taken as f2, . . . , f9, . . . . From the time ta1 to the time ta2, not a backlash control operation but a normal zoom operation is performed. Accordingly, the captured images f1 to f4 are stored in the DRAM 14 as they are, and then displayed on the display section 17 as a live view display. In practice, predetermined reduction processing, decimation processing, or color correction processing may be performed by the image processing section 8.

Next, from the time ta3 to the time ta5, a backlash control operation is performed. Accordingly, the images f5, f6, and f7 captured from the CCD 5 during this period are each associated with the current position of the zoom lens 2a, and then transferred to the DRAM 14. These captured images f5, f6, and f7 in the DRAM 14 are each transferred to the image processing section 8 at predetermined timing. Then, in accordance with a focal length at the target position (WIDE end) and a focal length at the current position of the zoom lens 2a associated with each captured image, the image processing section 8 trims the captured images f5, f6, and f7, and then digitally zooms these images to an image size for use in a live view or the size of the images before being trimmed. Next, these images are displayed on the display section 17 as a live view. Then, the backlash control operation ends at the time ta5, and therefore the images f8, f9, etc. captured thereafter are stored in the DRAM 14 as they are and displayed on the display section 17 as a live view.

FIG. 5 is a schematic view showing an example of display by the digital camera 1 according to the present embodiment. On the left side of FIG. 5, an image bounce occurring due to a backlash control operation is depicted. By the zoom lens moving from the WIDE end to the maximum WIDE end and returning from the maximum WIDE end to the WIDE end, a bounce occurs by which the viewing angle significantly changes as if a preview image once becomes small (wide angle) and then becomes large again.

However, if the image correction processing of the present invention is performed, the peripheries of the captured images are trimmed and the trimmed images are digitally zoomed (enlarged) to the normal size (live view size), whereby the viewing angle hardly changes even during the backlash control operation, as depicted on the right side of FIG. 5. Thus, it is evident that the bounce can be reduced by the present invention. In addition, it is evident that the display of vignetting occurring at the maximum WIDE end can be eliminated. Also, in the correction processing of the present embodiment, actual captured images are used, and therefore the subject does not freeze and the user does not feel a sense of incongruity.

According to the above-described embodiment, the peripheries of captured images are trimmed in accordance with a focal length at the WIDE end and a focal length at the current position of the lens. Therefore, display of noise, vignetting, and the like around the lens in the wide-angle range can be reduced. Also, since the trimmed images are processed to be enlarged to the normal size (size for use in a live view), the viewing angle of a live view image during a backlash control operation becomes constant, and a bounce in the zoom operation can be reduced. Moreover, since the live view image is not a still image, a very natural zoom image can be displayed without temporarily freezing or making the user feel a sense of incongruity.

In the above-described embodiment, the backlash control operation at the WIDE end has been described. However, the image processing of the above-described embodiment is effective also for a backlash control operation occurring when the zoom lens is moving from the TELE end side to the WIDE end.

Also, in the above-described embodiment, in a backlash control operation, the peripheries of captured images are trimmed in accordance with a focal length at the WIDE end and a focal length at the current position of the lens, and the trimmed images are digitally zoomed to the size of the images before being trimmed. However, a configuration may be adopted in which, after being digital zoomed in accordance with a focal length at the WIDE end and a focal length at the current position of the lens, captured images are trimmed to their original size.

Moreover, in the above-described embodiment, parameters required for image processing are calculated from a focal length at the WIDE end and a focal length at the current position of the lens. However, the present invention is not limited thereto. Since the focal length at the WIDE end is fixed, a configuration may be adopted in which current positions of the lens and parameters required for image processing which have been calculated in advance are associated with each other and tabulated, and parameters required for image processing are obtained by referring to a table generated by the tabulation.

While the present invention has been described with reference to the preferred embodiments, it is intended that the invention be not limited by any of the details of the description therein but includes all the embodiments which fall within the scope of the appended claims.

What is claimed is:

1. An imaging apparatus having an optical zoom mechanism, comprising:
    an imaging section;
    a correcting section which corrects a viewing angle of an image captured by the imaging section in accordance with a difference between a current position and a target position of a zoom lens obtained when a zoom operation of the optical zoom mechanism is performed;
    a display section which displays the image corrected by the correcting section; and
    a backlash control section which, when stopping the zoom lens, which is being moved in a predetermined direction, at a predetermined target position, performs a backlash control operation in which the zoom lens is moved by an extra distance and then returned back to the predetermined target position,
    wherein the correcting section corrects the viewing angle of the image captured by the imaging section in accordance with a backlash amount that is the difference between the current position and the target position of the zoom lens when the backlash control operation is being performed.

2. The imaging apparatus according to claim 1, wherein the correcting section changes a correction amount of the viewing angle in accordance with a change of the backlash amount when the backlash control operation is being performed.

3. The imaging apparatus according to claim 1, wherein the correcting section corrects the viewing angle by trimming periphery of the captured image and digitally zooming the trimmed image to a size of the captured image before being trimmed.

4. An imaging apparatus having an optical zoom mechanism, comprising:
    an imaging section;
    an image correcting section which corrects a viewing angle of an image captured by the imaging section in accordance with a difference between a current position and a target position of a zoom lens obtained when a zoom operation of the optical zoom mechanism is performed;
    a display section which displays the image corrected by the image correcting section;
    a defining section which defines in advance an operating range in which a predetermined optical property can be maintained, within a maximum range in which the zoom lens can be moved;
    a judging section which judges whether the current position of the zoom lens obtained when the zoom operation is performed exceeds the operating range defined by the defining section; and
    a backlash control section which, when stopping the zoom lens, which is being moved in a predetermined direction, at a predetermined target position, performs a backlash control operation in which the zoom lens is moved by an extra distance and then returned back to the predetermined target position,
    wherein the image correcting section corrects the viewing angle of the image captured by the imaging section when the judging section judges that the current position of the zoom lens exceeds the operating range defined by the defining section, and
    wherein the backlash control section performs the backlash control operation when stopping the zoom lens being moved in the predetermined direction at an end of the operating range defined by the defining section.

5. The imaging apparatus according to claim 4, wherein the image correcting section corrects the viewing angle when the judging section judges that the current position of the zoom lens exceeds a WIDE end that is an end of a wide angle side of the operating range defined by the defining section, and does not correct the viewing angle when the judging section judges that the current position of the zoom lens exceeds a TELE end that is an end of a telephoto side of the operating range defined by the defining section.

6. The imaging apparatus according to claim 5, wherein the image correcting section corrects the viewing angle of the image captured by the imaging section to a viewing angle corresponding to a focal length at the WIDE end, when the judging section judges that the current position of the zoom lens exceeds a WIDE end that is the end of the wide angle side of the operating range defined by the defining section.

7. The imaging apparatus according to claim 4, wherein the image correcting section corrects the viewing angle of the image captured by the imaging section to a viewing angle corresponding to a focal length at a WIDE end, when the judging section judges that the current position of the zoom lens exceeds a WIDE end that is an end of a wide angle side of the operating range defined by the defining section.

8. The imaging apparatus according to claim 4, wherein the correcting section changes a correction amount of the viewing angle in accordance with a change of an amount that the current position of the zoom lens exceeds the operating range defined by the defining section.

9. The imaging apparatus according to claim 4, wherein the correcting section corrects the viewing angle by trimming a periphery of the captured image and digitally zooming the trimmed image to a size of the captured image before being trimmed.

10. A viewing angle correction method performed by an imaging apparatus having an optical zoom mechanism, comprising:
performing imaging;
correcting a viewing angle of a captured image in accordance with a difference between a current position and a target position of a zoom lens obtained when a zoom operation of the optical zoom mechanism is performed;
displaying the corrected image; and
when stopping the zoom lens, which is being moved in a predetermined direction, at a predetermined target position, performing a backlash control operation in which the zoom lens is moved by an extra distance and then returned back to the predetermined target position,
wherein, in the correcting, the viewing angle of the captured image is corrected in accordance with a backlash amount that is the difference between the current position and the target position of the zoom lens when the backlash control operation is being performed.

11. A non-transitory computer-readable storage medium having stored thereon a program that is executable by a computer which controls an imaging apparatus having an optical zoom mechanism, the program causing the computer to perform functions comprising:
performing imaging;
correcting a viewing angle of a captured image in accordance with a difference between a current position and a target position of a zoom lens obtained when a zoom operation of the optical zoom mechanism is performed;
displaying the corrected image; and
when stopping the zoom lens, which is being moved in a predetermined direction, at a predetermined target position, performing a backlash control operation in which the zoom lens is moved by an extra distance and then returned back to the predetermined target position,
wherein, in the correcting, the viewing angle of the captured image is corrected in accordance with a backlash amount that is the difference between the current position and the target position of the zoom lens when the backlash control operation is being performed.

12. A viewing angle correction method performed by an imaging apparatus having an optical zoom mechanism, comprising:
performing imaging;
correcting a viewing angle of a captured image captured in accordance with a difference between a current position and a target position of a zoom lens obtained when a zoom operation of the optical zoom mechanism is performed;
displaying the corrected image;
defining in advance an operating range in which a predetermined optical property can be maintained, within a maximum range in which the zoom lens can be moved;
judging whether the current position of the zoom lens obtained when the zoom operation is performed exceeds the defined operating range; and
when stopping the zoom lens, which is being moved in a predetermined direction, at a predetermined target position, performing a backlash control operation in which the zoom lens is moved by an extra distance and then returned back to the predetermined target position,
wherein, in the correcting, the viewing angle of the captured image is corrected when it is judged that the current position of the zoom lens exceeds the defined operating range, and
wherein the backlash control operation is performed when stopping the zoom lens being moved in the predetermined direction at an end of the defined operating range.

13. A non-transitory computer-readable storage medium having stored thereon a program that is executable by a computer which controls an imaging apparatus having an optical zoom mechanism, the program causing the computer to perform functions comprising:
performing imaging;
correcting a viewing angle of a captured image in accordance with a difference between a current position and a target position of a zoom lens obtained when a zoom operation of the optical zoom mechanism is performed;
displaying the corrected image;
defining in advance an operating range in which a predetermined optical property can be maintained, within a maximum range in which the zoom lens can be moved;
judging whether the current position of the zoom lens obtained when the zoom operation is performed exceeds the defined operating range; and
when stopping the zoom lens, which is being moved in a predetermined direction, at a predetermined target position, performing a backlash control operation in which the zoom lens is moved by an extra distance and then returned back to the predetermined target position,
wherein, in the correcting, the viewing angle of the captured image is corrected when the judging function judges that the current position of the zoom lens exceeds the defined operating range, and
wherein the backlash control operation is performed when stopping the zoom lens being moved in the predetermined direction at an end of the defined operating range.

* * * * *